June 3, 1952   D. P. FORBES ET AL   2,599,248
DUAL WHEEL SINGLE RIM ADAPTER

Filed March 3, 1950   2 SHEETS—SHEET 1

Inventors
Duncan P. Forbes
Sylvester A. Malthaner
By McCanna and Morsbach
Attys.

June 3, 1952  D. P. FORBES ET AL  2,599,248
DUAL WHEEL SINGLE RIM ADAPTER
Filed March 3, 1950  2 SHEETS—SHEET 2
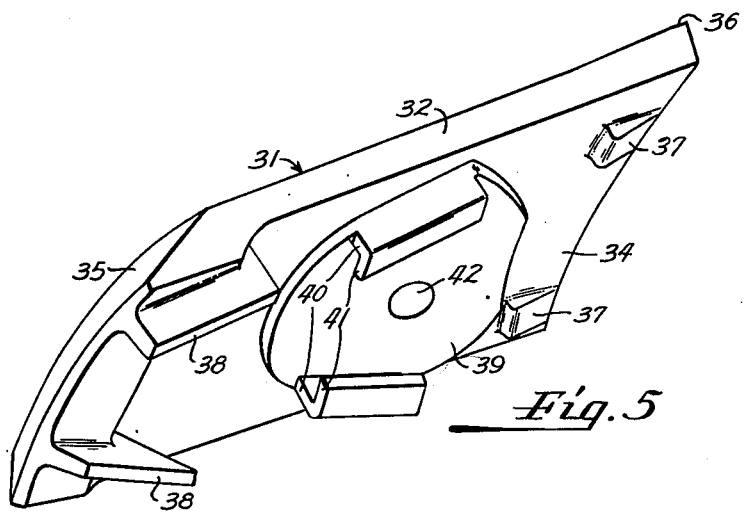
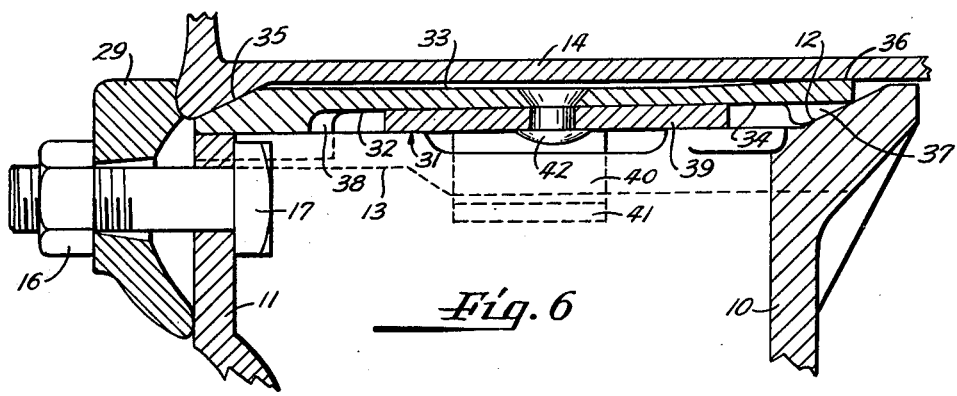
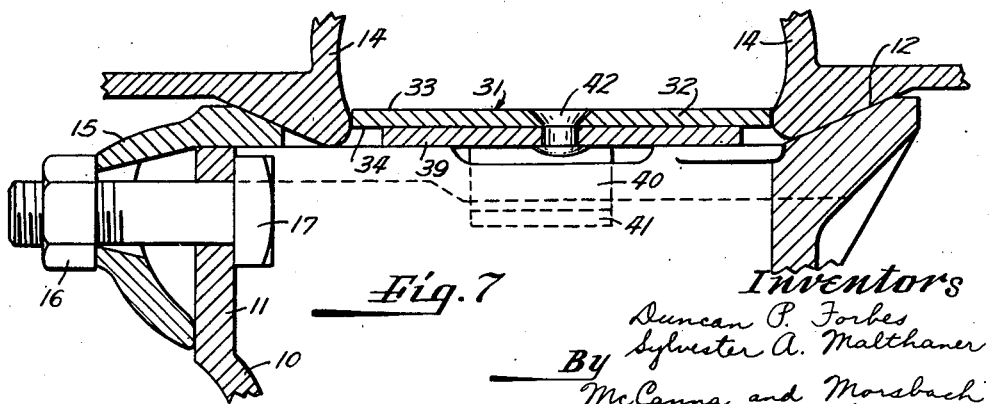
Inventors
Duncan P. Forbes
Sylvester A. Malthaner
By McCanna and Morsbach
Attys.

Patented June 3, 1952

2,599,248

UNITED STATES PATENT OFFICE 2,599,248

DUAL WHEEL SINGLE RIM ADAPTER

Duncan P. Forbes and Sylvester A. Malthaner, Rockford, Ill., assignors to Gunite Foundries Corporation, Rockford, Ill., a corporation of Illinois Application March 3, 1950, Serial No. 147,526

11 Claims. (Cl. 301—13)

The present invention relates to an adapter for permitting use of a single rim on a dual wheel, that is, a wheel designed to carry a pair of rims side by side, pneumatic tires normally being mounted in the rims. The invention also relates to an adapter which serves to space the dual rims when they are employed on the wheel.

Dual wheels are commonly used on large vehicles, such as trucks, trailers, buses, and the like. Numerous occasions arise, particularly with trucks and tractors, when single wheel operation is advantageous, and in such cases it is desirable to have convenient means for mounting a single rim and tire on the wheel. This invention provides a simple, easily applied adapter as such means. Briefly, the adapter in one form comprises a plate-like member which may be disposed over the end of a spoke, and having means such as lugs for initially maintaining it in position. The outboard end of the member has a tapered surface on its radially outer face on which a correspondingly angled portion of a rim may seat, and a tapered surface on its radially inner face at its inboard end for engaging on an inclined rim seat on the wheel. The inboard end of the radially outer face is offset slightly from the remainder to provide a bearing surface. As the adapter and rim are moved axially inwardly in the operation of clamping the rim on the wheel, the tapered surfaces of the member cause a wedging action on the rim at both outboard and inboard portions thereof by the outboard tapered surface and the inboard bearing surface, so that the load is uniformly distributed, and position the rim substantially concentrically of the wheel, a plurality of the adapters being of course employed. The proportions are such that the wedging action on the rim causes it to be positioned substantially centrally of the wheel in the axial direction.

In another form of the invention, the adapter comprises a plate-like member generally similar to that described above, but this member is rotatably mounted on a pivot extending from a base member having lugs or other means for securing the adapter on a wheel spoke. The adapter operates in substantially the same manner as the first form of the invention when the plate-like member is disposed extending parallel to the wheel axis. When the member is turned ninety degrees to extend with its axis in or parallel to the plane of the wheel it serves as a spacer for the pair of rims normally carried by the wheel. Thus the adapter eliminates the usual spacing ring or band, and is always available when only one rim is desired to be carried by the wheel.

One object of the invention is the provision of a simple device for easily and quickly changing a dual rim wheel to a single rim wheel. Another object is to provide a device for adapting a dual rim wheel for single rim operation which supports the single rim at both outboard and inboard portions thereof. A further object is the provision of a device for adapting a dual rim wheel to single rim operation which assures precise centering of the rim both axially and radially of the wheel. Still another object is to provide a device for adapting a dual rim wheel to support only a single rim which serves as a spacer for the two rims in dual rim operation. It is also an object of the invention to provide a wheel assembly designed for normal operation with dual rims and convertible to single rim operation by inclusion of the disclosed adapter therein. Another object is the provision of a wheel assembly including an adapter which in dual rim operation serves to maintain the rims in desired spaced relation and in single rim operation serves as the means for mounting the single rim on the wheel.

Other and further objects, advantages, and features of the invention will be apparent to those skilled in the art from the following description, together with the accompanying drawings, in which:

Fig. 5 is a perspective view of another form of the adapter;

Fig. 6 is a view similar to Figure 1, but showing the other form of adapter applied to the wheel in its single rim supporting position, and Fig. 7 is a view similar to Fig. 6, but with the adapter in its dual rim spacing position.

Figure 1:
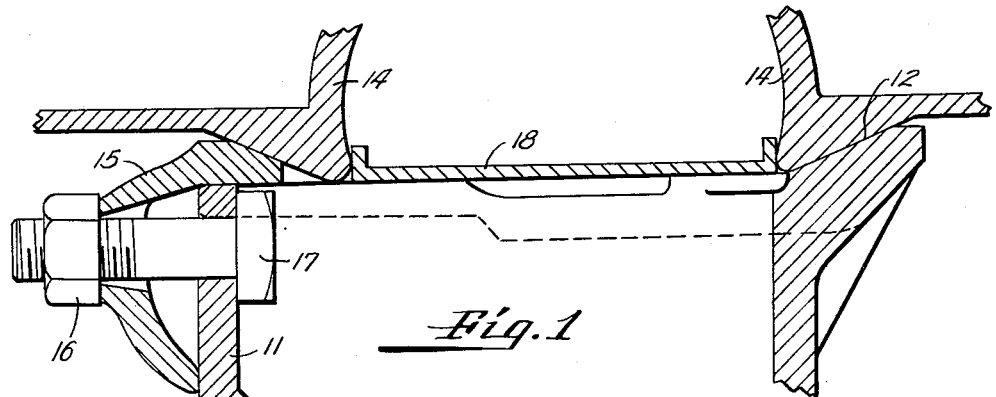
Figure 1 is a fragmentary sectional view taken through a spoke of a conventional dual rim wheel.
Figure 3:
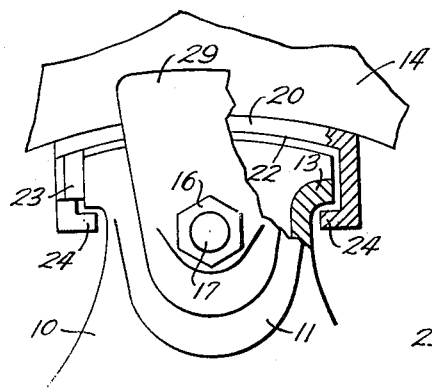
Fig. 3 is a fragmentary elevational view of the structure shown in Fig. 2, from the outboard side, with parts broken away.

Referring particularly to Figure 1 of the drawings, there is shown a spoke 10 of a hollow felloeless wheel spider of a generally used type. At its radially outer end, the spoke 10 has a flat radially extending portion 11 on its outboard face, and an angled rim seat portion 12 extending radially and axially outwardly from its inboard face. The end edges of the spoke between the flat portion 11 and the rim seat portion 12 are flared circumferentially outwardly to provide flanges 13, as shown in Fig. 3. A pair of rims 14 of the gutter type are mounted on the spider, the outboard rim being secured by a wedge clamp 15 engaging the gutter portion thereof and adapted to be moved axially to tight clamping position by means of a nut 16 on the outer end of a bolt 17 projecting axially outwardly through the portion 11 and the clamp. The inboard rim is secured by engagement of its gutter portion on the seat portion 12, being wedged or clamped against the seat portion by a spacing ring or band 18 disposed between the rims 14 and transmitting the clamping pressure of the clamp 15. The head of the bolt 17 and the radially inner end of the clamp bear on the flat portion 11 from opposite sides.

Figure 4:
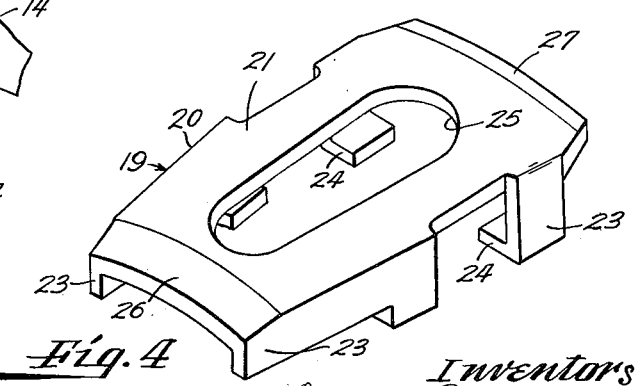
Fig. 4 is an isometric view of the form of the adapter shown in Figs. 1 to 3.

The wheel assembly of Figure 1 may be converted to serve as a single rim wheel by means of the adapter generally designated 19. The adapter comprises a plate 20 (Fig. 4) having a radially outer face 21 and a radially inner face 22, side flanges 23, and ears or lugs 24 extending inwardly from the flanges. The flanges may be interrupted, as shown, to facilitate application of the adapter to the spoke, and the plate may be of general coffin shape as shown for the same reason, but may assume any other suitable shape. An aperture 25 may be formed in the plate to reduce the weight thereof. The plate is arcuately curved in cross-section to correspond to the curvature of the spoke end and the rims. The face 21 at one end of the plate is formed to provide an angled wedging surface 26, and at the other end is offset slightly to provide a bearing surface 27. At this other end of the plate, the face 22 is formed with a plurality of projections with wedging surfaces 28. Of course, the projections may be merged to provide a single wedging surface, if desired. The wedging surfaces 26 and 28 are substantially complementary to the rim gutter portion and the seat portion 12, respectively, and thus are substantially parallel to each other.

Figure 2:
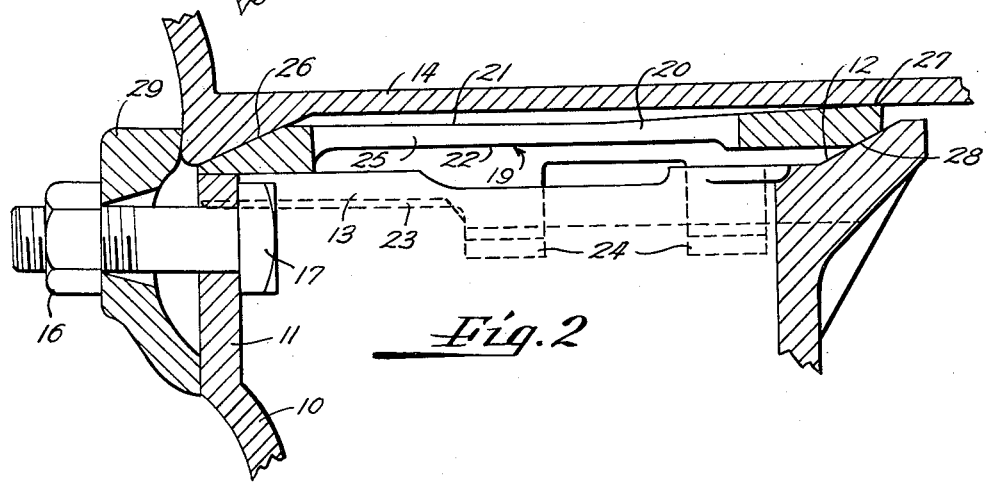
Fig. 2 is a view similar to Figure 1, but showing one form of the adapter of this invention applied to the wheel and supporting a single rim thereon.

To adapt the wheel assembly of Figure 1 so as to provide the single rim wheel assembly of Fig. 2, the nuts 16, clamps 15, rims 14 and spacing ring 18 are removed. One of the adapters 19 is then slipped over each spoke end, with the flanges 23 loosely engaging the edges of the spoke flanges 13, and the lugs 24 disposed radially inwardly of the spoke flanges to hold the adapters on the spokes regardless of the particular position of each spoke. A tight fit is not required, and in fact is not desired because of possible binding. One of the rims 14 is then slipped over the loosely positioned adapters, with its gutter portion engaging on the wedging surfaces 26 and its inboard portion extending over the rim seat portions 12 of the spokes, in partially seated position. Clamps 29 are then disposed on the bolts 17, with a radially outer portion of each engaging against an axially outer portion of the rim, and a radially inner portion bearing on the flat portion 11 of the spoke. The clamps 29 may be of any suitable form, but do not have a wedging portion like the clamps 15. The nuts 16 are then applied and tightened to move the clamps 29 axially inwardly, thereby moving the rim 14 in the same direction. By reason of the engagement of the gutter portion on the wedging surface 26 of the plate, the adapter 19 is also moved toward the inboard side of the wheel, its wedging surfaces 28 engaging and riding radially outwardly on the rim seat portion 12. The loose fit of the plate flanges permits this adapter movement. When the bearing portion 27 of the plate comes into engagement with the rim 14, the inboard end of the plate 20 is wedged between the rim seat portion 12 and the rim, and further axial movement of the adapter substantially prevented. Continued pressure on the clamp 29 by the nut 16 then moves the rim relative to the plate 20, so that the gutter portion of the rim is wedged radially outwardly by the wedging surface 26. The rim 14 is thus held securely on the spider by a wedging engagement at both the outboard and inboard portions thereof. The nuts 16, of course, are tightened by stages. It will be seen that the adapters 19 provide a means for mounting the single rim concentric with the wheel within very precise limits, and a brief comparison of Figs. 1 and 2 shows that the single rim is positioned with its midplane substantially in the "track" of the dual rim tires. The position of the rim axially of the wheel may be changed as desired by providing adapters with the wedging surface 26 disposed farther axially inwardly or outwardly than as shown. The wedging of the rim at the inboard as well as at the outboard edge not only assures proper positioning of the rim, but also provides better support therefor to relieve it of stresses to which it otherwise would be subjected, and brings about a more uniform distribution of the load through the wheel.

Another form of the adapter is shown in Figs. 5 to 7. Referring particularly to Fig. 5, the adapter 31 comprises a plate 32 generally similar to the plate 20, but flat and rectangular. The radially outer face 33 and radially inner face 34 of the plate 32 correspond to the faces 21 and 22 of the plate 20. The face 33 has a wedging surface 35 at its outboard end, and is offset slightly at its inboard end to form the bearing surface 36, these surfaces being arcuate. At the inboard end, the face 34 has a plurality of wedging projections 37, and at its outboard end has a pair of flanges 38, inwardly of the plate edges, spaced and angled like the flanges 23 of the adapter 19. The projections 37 have their wedging surfaces along a common arc, and might be merged to provide a single wedge surface. The inboard end of the face 34 may be arcuate, if desired. A base member 39, which may be in the form of a generally circular plate, is provided with a pair of flanges 40 having inwardly extending lugs 41. A suitable pivot 42 connects the plate 32 and base member 39 in rotatable relation, the member 39 having a flat face adjacent the face 34 of the plate 32. The radially inner face of the member 39 is arcuate to conform to the spoke end.

In Fig. 6, the adapter 31 is illustrated applied to the spoke 10, supporting a rim 14 in substantially the same manner as the adapter 19. The main difference lies in the initial positioning of the adapter 31 on the spoke end by the flanges 38, and the flanges 40 and lugs 41 of the base member 39. The application and operation of the adapter 31 are practically the same as in the case of the adapter 19, so far as single rim operation of the wheel is concerned, and no further description thereof is believed to be necessary. The spoke 10, rim 14, clamp 29, and bolt and nut in Fig. 6 are the same as in Fig. 2.

The adapter 31 is shown in Fig. 7 serving as a spacer for a pair of rims 14, instead of as a wedging support for a single rim. A plurality of the adapters thus replace the conventional spacing ring 18. When employed as a spacer, the adapter is positioned on the spoke end in the same manner as in Fig. 6, but the plate 32 is turned ninety degrees from its position as shown in Fig. 6. In this position, the side edges of the plate 32 engage against the axially inner portions of the rims 14, and the plate acts in substantially the same way as the spacing ring 18. The flanges 40 and lugs 41, because of their loose fit on the end of the spoke 10, permit the adapter to move under clamping pressure when the rim are secured on the wheel. In this connection, it may be noted that the wedge clamps 15 are employed, in the same manner as in the arrangement of Figure 1. It should be noted that when the plate 32 is to be rotated on the base member 39, the adapter is removed from the spoke, or substantially so, in order that the flanges 38 do not engage against the spoke to interfere with such rotation.

It will be seen that a plurality of the adapters 31 may be applied to the wheel spider in dual rim operation to function as spacing means for the rims, and thus be conveniently at hand when it is desired to change to single rim operation. It is then only necessary to remove the nuts 16, clamps 15, rims 14, and the adapters, rotate the plates 32 of the latter a quarter turn, apply the adapters to the spokes, position one of the rims thereon, apply clamps 29 instead of the clamps 15, and tighten the nuts 16. The converting operation may thus be accomplished very quickly and without difficulty. No parts in addition to those employed in the wheel assembly need be carried, except the clamps 29. Changing the wheel to dual rim operation may, of course, be accomplished just as simply and rapidly.

Although the adapter of this invention has been disclosed as designed to be used with a hollow felloeless wheel spider, it will be clear that it might readily be adapted for application to other types of wheels. It is not necessary that an adapter be positioned on each spoke, although such arrangement is preferable. Also, it is not absolutely necessary to the invention that the adapter conform to the circular shape of the rims and spoke end, but the arcuate formation of the parts as described affords precise fit and better operation, as will be obvious. The plate 29, like the plate 32, may be flat, at least on its radially outer surface, and only the portions engaging the spoke end and rim formed arcuate. Again, the plate 32 might be arcuate, or only its outer face be flat, and the base member be domed to conform to the inner face. It will be apparent that many changes and modifications of either or both of the forms of the adapter disclosed are possible, some of which have been pointed out hereinabove and others of which will readily suggest themselves, all without departing from the inventive concept disclosed. It is therefore not intended that the invention be limited except as required by the spirit and scope of the appended claims.

We claim:

1. A device for adapting a dual tire wheel including a wheel spider having a plurality of spokes each with a tapered rim seat portion at its radially outer inboard end to the support of a single tire rim of the gutter type, comprising a plate adapted for disposition over the radially outer end of a spoke, the outboard end of said plate having a radially inner surface to bear on said spoke end and an outer wedging surface adapted to receive the radially inner sloped surface of the rim gutter, and the inboard end of said plate having a radially inner tapered surface substantially corresponding to and slidable on said tapered rim seat portion and a radially outer bearing portion inclined outwardly from the wheel axis in a direction toward the inboard end of the wheel adapted to engage the radially inner rim surface, and means attached to said plate for releasably positioning said plate on said spoke.

2. An adapter for changing a dual rim wheel to support a single rim, comprising a plate having at the outboard end a tapered surface on its outer face and a bearing surface on its inner face and at the inboard end an engaging surface on its outer face offset outwardly from said outer face and a wedging surface on its inner face, said surfaces being arcuate transversely of said plate, and means attached to said plate for separably attaching said plate to the outer end of a spoke of said wheel.

3. A device for supporting a single rim of the gutter type on a normally dual rim wheel having a spoke with an angled rim seat portion at its inboard side, comprising a plate for disposition over the end of said spoke, a radially inner surface on the outboard end of said plate for bearing on said spoke end, a radially outer wedging surface on said outboard plate end, a radially inner tapered surface on the inboard plate end for engagement on said angled portion, a portion on the inboard plate end offset radially outwardly of the radially outer plate face, said wedging surface and offset portion being arcuate transversely of said plate and adapted to wedgingly engage said rim gutter and an inboard portion of the radially inner surface of said rim, respectively, upon relative movement of said rim on said plate in an inboard direction, and means attached to said plate extending radially inward therefrom intermediate the inboard and outboard ends thereof to engage the outer end of said spoke to prevent movement of the plate circumferentially of the wheel.

4. A device for adapting a dual rim wheel to support a single rim, comprising a plate having at one end a tapered surface on its outer face and a bearing surface on its inner face and at the other end an engaging surface offset outwardly from said outer face and a wedging surface on said inner face, said surfaces being arcuate transversely of said plate to form segments of circles, and means rotatably connected to said plate and extending inwardly therefrom for attaching the device to the outer end of a spoke of said wheel.

5. A device for spacing the rims of a dual rim wheel and for adapting the wheel to support a single rim, comprising a plate, a first wedging surface at one end and on one face of said plate, a second wedging surface at the other end and on the other face of said plate, a bearing portion at said other end offset outwardly from said one face, a base member, pivot means connecting said plate to said base member in rotatable relation, and means adapted to position the device adjacent the end of a wheel spoke.

6. A device for spacing the rims of a dual rim wheel having a spoke with an inboard angled rim seat portion and for adapting the wheel to mount a single rim of the gutter type, comprising a base member, a plate rotatably mounted on said member having a pair of substantially parallel side edge portions and adapted in one rotative position relative to said base member to engage between dual rims with one of said edge portions bearing on each rim and to engage between the end of said spoke and said single rim when rotated to another position substantially ninety degrees from said one position, a radially outer wedging surface on one end of said plate, a radially inner wedging surface on the other end of said plate, a radially outwardly offset portion on said other plate end, said outer wedging surface, offset portion, and inner wedging surface being arcuate transversely of said plate and in said other position thereof engaging the gutter portion of said rim, an inboard portion of the rim, and said angled rim seat portion of the spoke, respectively, and means for positioning the device adjacent the end of said spoke in either of said plate positions.

7. A dual rim vehicle wheel assembly adapted to mount a single rim, comprising a wheel spider including a spoke, an angled rim seat portion at the inboard side of said spoke, a pair of spaced gutter type rims disposed about said spider, the inboard of said rims having an angle gutter portion at its outboard side disposed on said rim seat portion and the outboard of said rims having an angled gutter portion at its inboard side, wedge means between said gutter portion of the outboard rim and said spoke, a spacer between said rims comprising a plate rotatably mounted on a base having means for positioning the spacer adjacent said spoke end, said plate having a pair of substantially parallel side portions engaging said rims in one rotative position of the plate relative to said base, and means to urge said wedge means, rims, and spacer in an inboard direction for securing said rims by wedging engagement of said gutter portions on said wedge means and angled seat portion, said spacer plate having at one end a first wedging surface on its radially outer face and at the other end a bearing portion offset outwardly from said outer face and a second wedging surface on the radially inner face thereof, said wedging surfaces and bearing portion being arcuately curved to conform to said rims and spoke end, said plate upon rotation thereof substantially ninety degrees from said one position and removal of said wedge means and rims affording support for a single disposed rim disposed about said spider, said radially inner face at said one end bearing on said spoke end at the outboard side and said second wedging surface bearing on said angled rim seat portion, and said first wedging surface and offset bearing portion bearing on said gutter portion and an inboard portion respectively of said single rim for radially outward wedging thereof upon movement thereof in an inboard direction by said urging means.

8. A vehicle wheel and rim assembly comprising a wheel spider including a spoke, an angled rim seat portion at the inboard side of said spoke extending radially and axially outwardly, a rim disposed about said spider, a tapered surface on the radially inner face of said rim at the portion thereof adjacent the outboard side of said spider extending radially inwardly and axially outwardly, and a separate wedging member disposed between said spoke and rim, said member having on its radially outer face at its outboard end a first wedging surface substantially complementary to said tapered rim surface and engaging thereon and having on its radially inner face at its inboard end a second wedging surface substantially complementary to said angled rim seat portion and engaging thereon, a bearing portion on the inner face of said wedging member at its outboard end bearing on the spoke, and a bearing portion on the outer face of said wedging member at its inboard end offset radially outwardly of said member wedged between the rim and said angled rim seat portion at the inboard side of said spoke.

9. A vehicle wheel and rim assembly comprising a wheel spider including a spoke having a tapered rim seat portion extending radially and axially outwardly at its inboard side, a rim disposed about said spider, a radially inward and axially outward tapered surface on the radially inner face of said rim at the portion thereof adjacent the outboard side of said spider, and a separate wedging member disposed between said spoke and rim, said member having at its outboard end a wedging surface on its outer face bearing on said tapered rim surface and, on its inner face a surface bearing on said spoke and having at its inboard end a tapered surface on its inner face and an engaging surface offset outwardly of said outer face of said member, said wedging and bearing surfaces at the outboard end of the wedging member respectively engaging said tapered rim surface and said spoke and said engaging surface and tapered surface at the inboard end of the wedging member respectively engaging the radially inner surface of said rim and said tapered rim seat portion, and clamping means on said spoke engaging said rim to maintain said rim wedged radially outwardly of said spoke by said wedging and engaging surfaces on the outer face of said wedging member.

10. The device of claim 1, wherein said means for positioning the plate on the spoke is attached to the plate intermediate the inboard and outboard ends thereof and extends radially inward therefrom to engage the spoke at the radially outer end thereof.

11. The device of claim 1, wherein said means for positioning the plate on the spoke comprises arms extending radially inward at opposite sides of the plate intermediate the inboard and outboard ends thereof and formed with inturned extremities for engagement with the radially outer end of the wheel spoke at opposite edges thereof.

DUNCAN P. FORBES.
SYLVESTER A. MALTHANER.

REFERENCES CITED

The following references are of record in the file of this patent:

UNITED STATES PATENTS

| Number | Name | Date |
| --- | --- | --- |
| 1,085,773 | Wagenhorst | Feb. 3, 1914 |
| 1,196,069 | Baldwin | Aug. 29, 1916 |
| 1,893,947 | Keller | Jan. 10, 1933 |
| 1,972,610 | Walther | Sept. 4, 1934 |